(No Model.)
A. DE WITT.
POST HOLE AUGER.
No. 512,540. Patented Jan. 9, 1894.
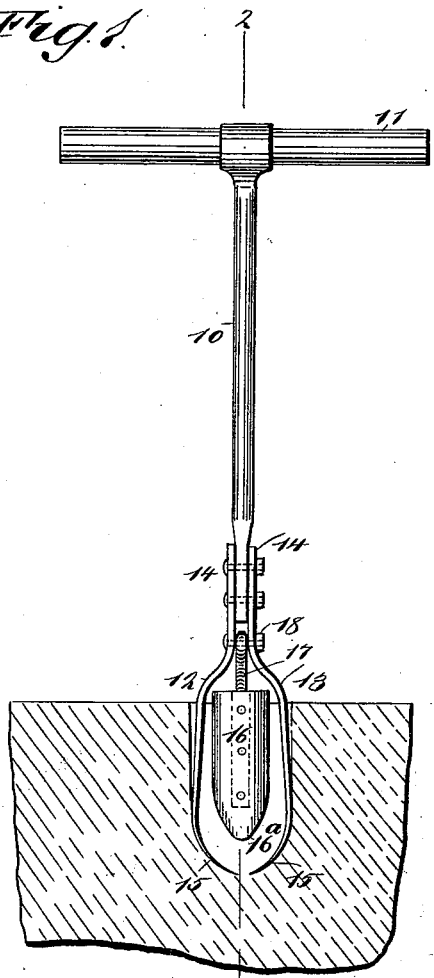
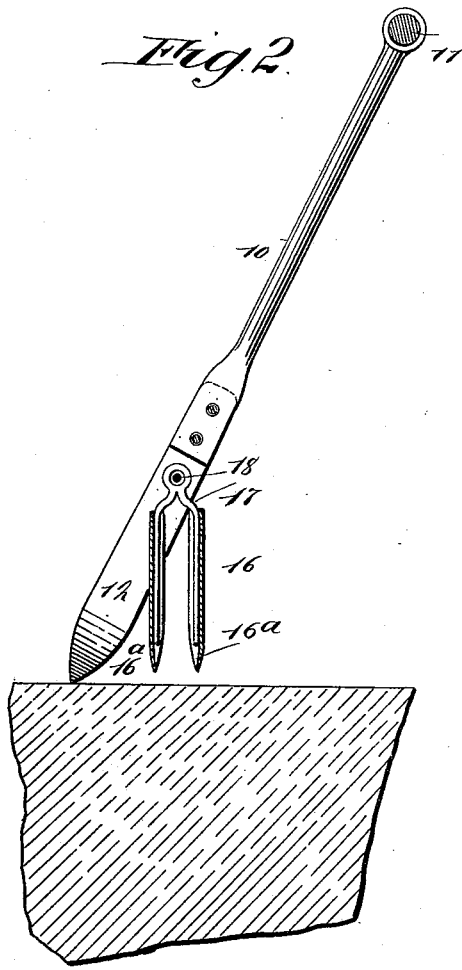
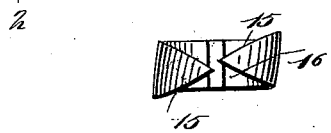
WITNESSES:
Francis McArdle.
C. Sedgwick
INVENTOR
A. DeWitt
BY Munn & Co.
ATTORNEYS.
THE NATIONAL LITHOGRAPHING COMPANY,
WASHINGTON, D. C.

UNITED STATES PATENT OFFICE.

ALVIN DE WITT, OF ELLIOTT, IOWA.

POST-HOLE AUGER.

SPECIFICATION forming part of Letters Patent No. 512,540, dated January 9, 1894.

Application filed July 19, 1893. Serial No. 480,876. (No model.)

*To all whom it may concern:*

Be it known that I, ALVIN DE WITT, of Elliott, in the county of Montgomery and State of Iowa, have invented a new and Improved Post-Hole Auger, of which the following is a full, clear, and exact description.

The auger proper is composed of curved spring blades between which a dirt holder, or carrier, is pivoted and arranged in such a manner that it receives the dirt loosened by the auger, and, when the latter is removed from the hole and placed in an inclined position, the load will be discharged.

The invention consists in the novel construction and combination of the several parts, as will be hereinafter fully set forth and pointed out in the claims.

Reference is to be had to the accompanying drawings forming a part of this specification, in which similar figures of reference indicate corresponding parts in all the figures.

Figure 1 is a side elevation of the auger, illustrating it in boring position. Fig. 2 is a vertical section through the auger, taken on the line 2—2 of Fig. 1, and illustrating the dirt holder or carrier in its dumping position, the auger being removed from the post hole; and Fig. 3 is a bottom plan view of the auger.

The shank 10 and head 11 of the auger are of the usual type. The auger proper comprises two plates 12 and 13, the blades being constructed of spring steel, and each blade is provided with a shank 14, and the body of the blade curves outwardly from the shank and then downwardly almost vertically, but with a slight outward inclination, and each blade terminates at its lower end in an inwardly curved cutting section 15, said cutting section being pointed, and it is provided with a cutting edge upon both sides. The shanks of the spring blades are secured to the lower ends of the handle shank by means of bolts, or the equivalents thereof, and the substantially straight surfaces of the body face one another, and the inner faces of the straight body sections are substantially flat and smooth. The cutting ends of the spring blades approach one another as shown in Fig. 3, but the point of one blade is in advance of the point of the other blade; the outer surfaces of the curved or cutting surfaces 15 of the blades being inclined transversely in opposite directions. Thus it will be observed that when the auger is placed in the ground and is turned to bore a hole, the weight upon the auger will cause the blades to expand, and consequently the auger will cut a hole of much greater diameter than the true width of the auger.

Within the auger a dirt holder or carrier 16 is pivoted. This dirt holder or carrier comprises two opposing shovels 16ª having concaved inner faces, the shovels being connected by a bifurcated shank 17, which shank is pivoted upon a bolt 18, pin or like device, passed through the shank of the auger. The dirt holder or carrier is made of such width that when the auger is in an upright position the shovels will expand slightly beyond the side edges of the blades, and when the auger is in a vertical position the dirt holder will stand in the same position, whereas, when the auger is dropped to an inclined position, as shown in Fig. 2, the dirt holder will still maintain a vertical position and will virtually clear the auger, and in this position will empty its load.

It is evident that the auger may be expeditiously and conveniently manipulated, and that it is of exceedingly simple yet durable construction, and when in practice it is found desirable the dirt holder may be disconnected from the auger.

Having thus described my invention, I claim as new and desire to secure by Letters Patent—

1. A post-hole auger provided with a pivoted dirt holder capable of assuming a vertical position, no matter in what position the auger may be held, substantially as specified.

2. A post-hole auger provided with a dirt holder comprising opposing shovels and a shank connecting the shovels, the dirt holder being removably and pivotally located within the auger, as and for the purpose set forth.

ALVIN DE WITT.

Witnesses:
H. S. LEONARD,
W. J. WOOD.